US011991188B2

(12) United States Patent
Yarabolu

(10) Patent No.: US 11,991,188 B2
(45) Date of Patent: May 21, 2024

(54) COGNITIVE AUDITING OF CLIENT BOUND DATA

(71) Applicant: Bank of America Corporation, Charlotte, NC (US)

(72) Inventor: Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 398 days.

(21) Appl. No.: 17/345,444

(22) Filed: Jun. 11, 2021

(65) Prior Publication Data

US 2022/0400122 A1   Dec. 15, 2022

(51) Int. Cl.
| | | |
|---|---|---|
| *H04L 9/40* | (2022.01) | |
| *G06N 3/09* | (2023.01) | |
| *G06N 5/01* | (2023.01) | |
| *G06N 5/04* | (2023.01) | |
| *G06N 7/01* | (2023.01) | |
| *G06N 20/00* | (2019.01) | |
| *G06N 20/10* | (2019.01) | |

(52) U.S. Cl.
CPC .......... *H04L 63/1416* (2013.01); *G06N 5/04* (2013.01); *G06N 20/00* (2019.01)

(58) Field of Classification Search
CPC ... H04L 63/1416; H04L 63/10; H04L 63/123; G06N 5/04; G06N 5/01; G06N 20/00; G06N 20/10; G06N 3/09; G06N 7/01
See application file for complete search history.

(56) References Cited

U.S. PATENT DOCUMENTS

| | | | |
|---|---|---|---|
| 9,380,072 | B2 | 6/2016 | Paul et al. |
| 9,792,440 | B1 * | 10/2017 | Wang .................. H04L 63/1466 |
| 2001/0011681 | A1 | 8/2001 | Edens et al. |
| 2003/0149888 | A1 | 8/2003 | Yadav |
| 2005/0066165 | A1 | 3/2005 | Peled et al. |
| 2005/0251855 | A1 | 11/2005 | Brandstatter |
| 2006/0020814 | A1 | 1/2006 | Lieblich et al. |
| 2006/0195201 | A1 | 8/2006 | Nauck et al. |
| 2009/0327414 | A1 | 12/2009 | Cooney et al. |

(Continued)

OTHER PUBLICATIONS

A Classification of SQL Injection Attacks and Countermeasures, by Halfond et al.; published 2006 (Year: 2006).*

*Primary Examiner* — Vu V Tran
(74) *Attorney, Agent, or Firm* — Banner & Witcoff, Ltd.

(57) ABSTRACT

Aspects of the disclosure relate to cognitive auditing of client bound data. A computing platform may intercept a request from a user device to an application server. The computing platform may identify content requested by the user device and generate predicted response data based on the requested content. The computing platform may transmit the request to the application server. The computing platform may receive, from the application server, actual response data. The computing platform may validate the actual response data by comparing the actual response data with the predicted response data. Based on comparing the actual response data with the predicted response data, the computing platform may identify whether the actual response data matches the predicted response data. Based on identifying that the actual response data matches the predicted response data, the computing platform may send the actual response data to the user device.

20 Claims, 8 Drawing Sheets

(56) References Cited

U.S. PATENT DOCUMENTS

| | | |
|---|---|---|
| 2012/0110665 A1 | 5/2012 | Abdul et al. |
| 2012/0144449 A1 | 6/2012 | Peled et al. |
| 2012/0246213 A1 | 9/2012 | Ma et al. |
| 2012/0307680 A1 | 12/2012 | Kim et al. |
| 2012/0324225 A1 | 12/2012 | Chambers et al. |
| 2012/0331543 A1 | 12/2012 | Bostrom et al. |
| 2013/0166703 A1 | 6/2013 | Hammer et al. |
| 2013/0247167 A1 | 9/2013 | Paul et al. |
| 2014/0143358 A1 | 5/2014 | Beausoleil et al. |
| 2016/0234216 A1 | 8/2016 | Fausak et al. |
| 2018/0137286 A1* | 5/2018 | Ionescu ............... G06F 11/3688 |
| 2018/0191661 A1 | 7/2018 | Beausoleil et al. |
| 2020/0244455 A1 | 7/2020 | Teitzel et al. |
| 2021/0150051 A1 | 5/2021 | van'T Noordende |
| 2022/0021521 A1* | 1/2022 | Shamai ................ H04L 9/0869 |
| 2022/0046031 A1* | 2/2022 | Kaidi ................ H04L 63/1433 |

\* cited by examiner

COGNITIVE AUDITING OF CLIENT BOUND DATA

BACKGROUND

Aspects of the disclosure generally relate to one or more computer systems, servers, and/or other devices including hardware and/or software. In particular, one or more aspects of the disclosure relate to cognitive auditing of client bound data.

Typically, requests are processed at a server and data is returned to a client without checks on the client bound data. In some examples, authentication tokens may be misused by attackers to fetch out-of-context data. For instance, an authentication token intended for payments may be used to fetch account balances. In some instances, structured query language (SQL) injection attacks may cause sensitive data (e.g., bank account numbers, security credentials, credit card numbers, personal data, etc.) to be unintentionally exposed. It may be difficult to validate client bound data to ensure that appropriate or necessary data is returned.

SUMMARY

Aspects of the disclosure provide effective, efficient, scalable, and convenient technical solutions that address and overcome the technical problems associated with cognitive auditing for client bound data. In particular, one or more aspects of the disclosure provide an additional layer of protection at a server side to audit client bound data by cognitive analysis. Additional aspects of the disclosure may prevent unauthorized data access attacks such as SQL injection attacks. Additional aspects of the disclosure may validate client bound data against client requests.

In accordance with one or more embodiments, a computing platform having at least one processor, a communication interface, and memory may intercept a request from a user device to an application server. Subsequently, the computing platform may identify content requested by the user device. Next, the computing platform may generate predicted response data based on the content requested by the user device. Thereafter, the computing platform may transmit the request to the application server. Responsive to transmitting the request to the application server, the computing platform may receive, from the application server, actual response data. Then, the computing platform may validate the actual response data by comparing the actual response data with the predicted response data. Based on comparing the actual response data with the predicted response data, the computing platform may identify whether the actual response data matches the predicted response data. Based on identifying that the actual response data matches the predicted response data, the computing platform may send the actual response data to the user device.

In some embodiments, based on identifying that the actual response data does not match the predicted response data, the computing platform may block the actual response data from being sent to the user device.

In some arrangements, based on identifying that the actual response data does not match the predicted response data, the computing platform may send an alert to an administrative computing device.

In some examples, the computing platform may train a machine learning model based on historical response data, and generate the predicted response data based on the trained machine learning model.

In some embodiments, training the machine learning model based on the historical response data may include training the machine learning model based on actual data from previous responses to requests over a predetermined period of time.

In some example arrangements, validating the actual response data may include verifying a structure of the actual response data.

In some embodiments, validating the actual response data may include verifying content of the actual response data.

In some examples, the request from the user device to the application server may include a request for sensitive information.

In some embodiments, generating the predicted response data based on the content requested by the user device may include identifying a context of the request from the user device to the application server.

In some embodiments, generating the predicted response data based on the content requested by the user device may include identifying a type of the request from the user device to the application server.

In some embodiments, the computing platform may store the predicted response data generated based on the content requested by the user device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
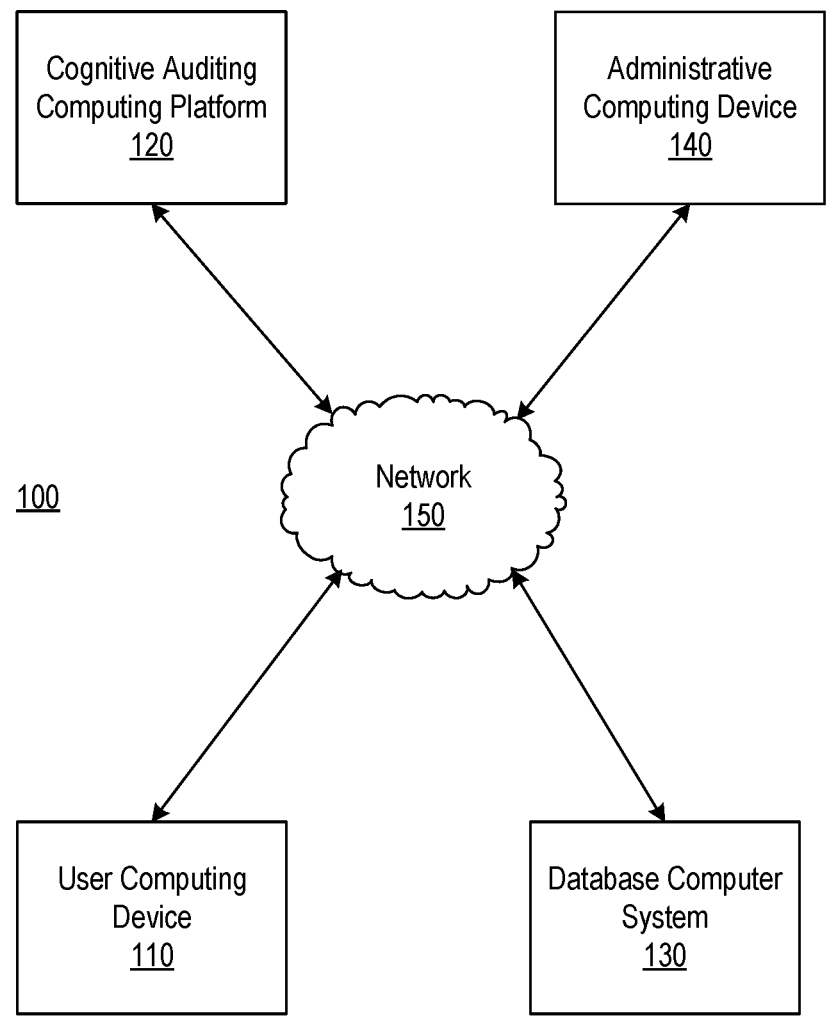
FIGS. 1A and 1B depict an illustrative computing environment for cognitive auditing of client bound data in accordance with one or more example embodiments.
Figure 1B:
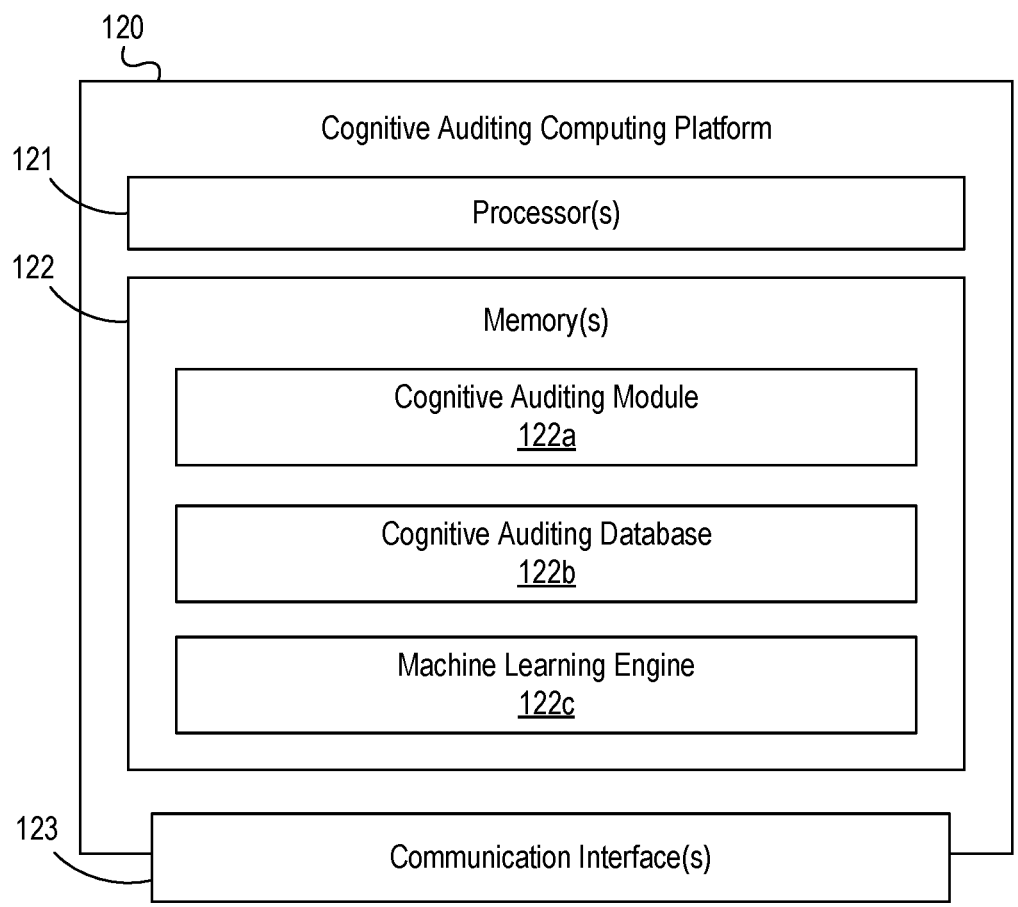

FIGS. 1A and 1B depict an illustrative computing environment for cognitive auditing of client bound data in accordance with one or more example embodiments. Referring to FIG. 1A, computing environment 100 may include one or more computing devices and/or other computing systems. For example, computing environment 100 may include user computing device 110, cognitive auditing computing platform 120, database computer system 130, and administrative computing device 140. Although one user computing device 110 is shown for illustrative purposes, any number of user computing devices may be used without departing from the disclosure. In addition, although one administrative computing device 140 is shown for illustrative purposes, any number of administrative computing devices may be used without departing from the disclosure.

As illustrated in greater detail below, cognitive auditing computing platform 120 may include one or more computing devices configured to perform one or more of the functions described herein. For example, cognitive auditing computing platform 120 may include one or more computers (e.g., laptop computers, desktop computers, servers, server blades, or the like).

User computing device 110 may include one or more computing devices and/or other computer components (e.g., processors, memories, communication interfaces). For instance, user computing device 110 may be a server, desktop computer, laptop computer, tablet, mobile device, or the like, and may be used by a software developer, or the like. In addition, user computing device 110 may be associated with an enterprise organization operating cognitive auditing computing platform 120. In some examples, user computing device 110 may run an application program for processing client requests.

Database computer system 130 may be configured to receive information from, send information to, and/or otherwise exchange information with one or more devices and/or databases. Database computer system 130 may include different information storage entities storing request data, response data, request-response pairs, and/or other information associated with data validations or fraud verifications. In some examples, database computer system 130 may host the application server configured to receive client requests and provide server responses.

Administrative computing device 140 may include one or more computing devices and/or other computer components (e.g., processors, memories, communication interfaces). For instance, administrative computing device 140 may be a server, desktop computer, laptop computer, tablet, mobile device, or the like, and may be used by a software development manager or the like. In addition, administrative computing device 140 may be associated with an enterprise organization operating cognitive auditing computing platform 120.

Computing environment 100 also may include one or more networks, which may interconnect one or more of user computing device 110, cognitive auditing computing platform 120, database computer system 130, and administrative computing device 140. For example, computing environment 100 may include network 150. Network 150 may include one or more sub-networks (e.g., local area networks (LANs), wide area networks (WANs), or the like). For example, network 150 may include a private sub-network that may be associated with a particular organization (e.g., a corporation, financial institution, educational institution, governmental institution, or the like) and that may interconnect one or more computing devices associated with the organization. For example, user computing device 110, cognitive auditing computing platform 120, database computer system 130, and administrative computing device 140 may be associated with an organization (e.g., a financial institution), and network 150 may be associated with and/or operated by the organization, and may include one or more networks (e.g., LANs, WANs, virtual private networks (VPNs), or the like) that interconnect user computing device 110, cognitive auditing computing platform 120, database computer system 130, administrative computing device 140. Network 150 also may include a public sub-network that may connect the private sub-network and/or one or more computing devices connected thereto (e.g., user computing device 110, cognitive auditing computing platform 120, database computer system 130, and administrative computing device 140) with one or more networks and/or computing devices that are not associated with the organization.

In one or more arrangements, user computing device 110, cognitive auditing computing platform 120, database computer system 130, and administrative computing device 140 may be any type of computing device capable of receiving a user interface, receiving input via the user interface, and communicating the received input to one or more other computing devices. For example, user computing device 110, cognitive auditing computing platform 120, database computer system 130, administrative computing device 140, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions.

Referring to FIG. 1B, cognitive auditing computing platform 120 may include one or more processor(s) 121, memory(s) 122, and communication interface(s) 123. A data bus may interconnect processor 121, memory 122, and communication interface 123. Communication interface 123 may be a network interface configured to support communication between cognitive auditing computing platform 120 and one or more networks (e.g., network 150 or the like). Memory 122 may include one or more program modules having instructions that when executed by processor 121 cause cognitive auditing computing platform 120 to perform one or more functions described herein and/or one or more databases and/or other libraries that may store and/or otherwise maintain information which may be used by such program modules and/or processor 121.

In some instances, the one or more program modules and/or databases may be stored by and/or maintained in different memory units of cognitive auditing computing platform 120 and/or by different computing devices that may form and/or otherwise make up cognitive auditing computing platform 120. For example, memory 122 may have, store, and/or include a cognitive auditing module 122a, a cognitive auditing database 122b, and a machine learning engine 122c. Cognitive auditing module 122a may have instructions that direct and/or cause cognitive auditing computing platform 120 to validate client bound data against client requests and/or perform other functions, as discussed in greater detail below. Cognitive auditing database 122b may store information used by cognitive auditing module 122a and/or cognitive auditing computing platform 120 in performing cognitive auditing of client bound data and/or in performing other functions, as discussed in greater detail below. Machine learning engine 122c may have instructions that direct and/or cause cognitive auditing computing platform 120 to set, define, and/or iteratively redefine rules, techniques and/or other parameters used by cognitive auditing computing platform 120 and/or other systems in computing environment 100 in performing cognitive auditing of client bound data.

Figure 2A:
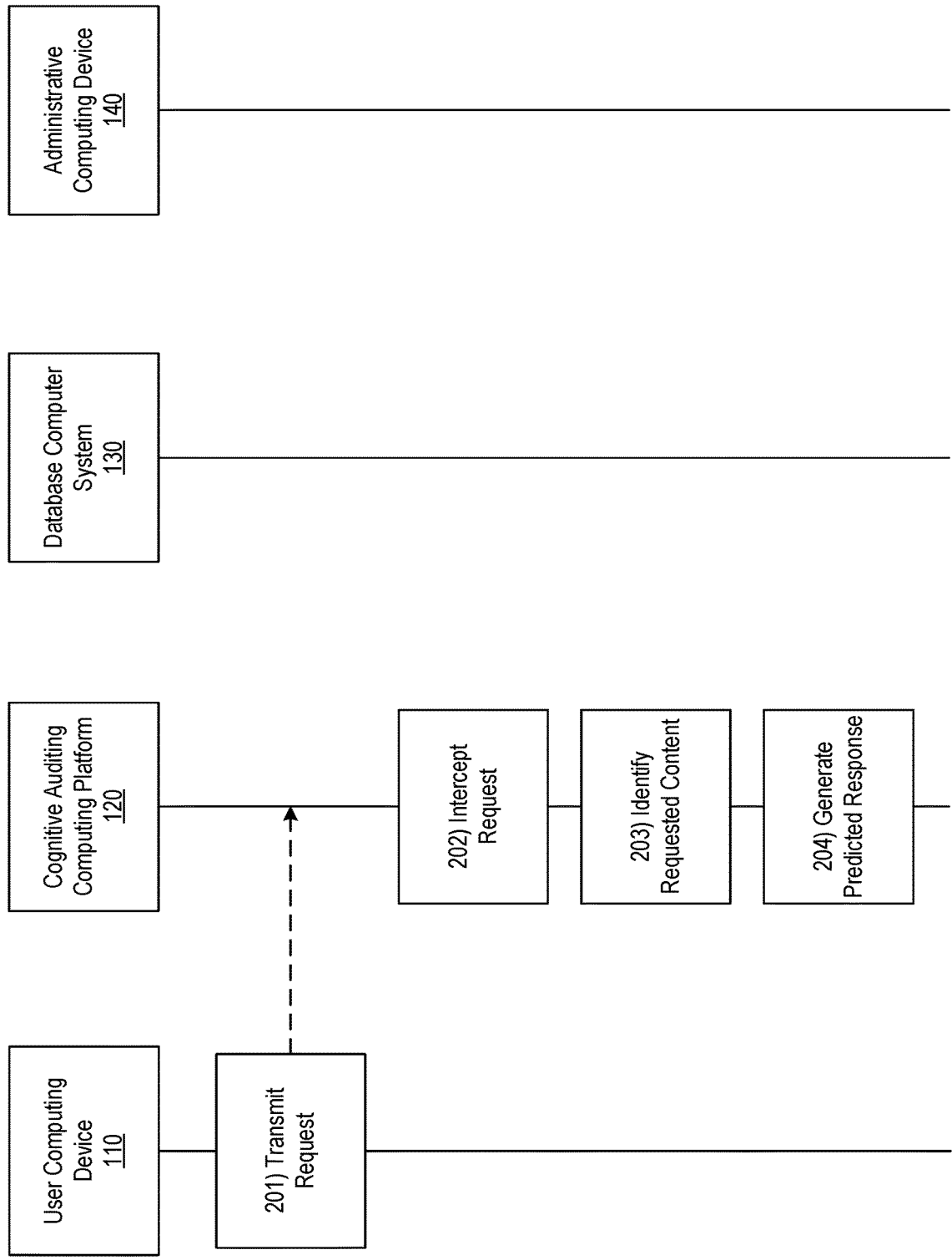
FIGS. 2A-2D depict an illustrative event sequence for cognitive auditing of client bound data in accordance with one or more example embodiments.

FIGS. 2A-2D depict an illustrative event sequence for cognitive auditing of client bound data in accordance with one or more example embodiments. Referring to FIG. 2A, at step 201, a user of a computing device (e.g., via an application running on user computing device 110), may attempt to send a request to an application server (e.g., database computer system 130 hosting the application server). In some examples, the request may include a request for sensitive information (e.g., customer data).

At step 202, cognitive auditing computing platform 120 may intercept the request from the user device (e.g., user computing device 110) on its way to the application server (e.g., database computer system 130). For example, cognitive auditing computing platform 120 may act as a filter (e.g., a firewall) with the data stream passing through the device.

At step 203, cognitive auditing computing platform 120 may evaluate the request and identify content information associated with the request by the user device (e.g., user computing device 110). In some examples, cognitive auditing computing platform 120 may identify a context of the request (e.g., whether the request is associated with a payment, a transfer, an account balance, a customer profile, and/or the like). In some examples, cognitive auditing computing platform 120 may identify an operation or type of the request (e.g., whether the request is a fund transfer, a peer-to-peer (P2P) transfer, an external transfer (e.g., Automated Clearing House (ACH) transfer), and/or the like).

At step 204, based on the content requested by the user device, cognitive auditing computing platform 120 may generate predicted response data. In some embodiments, computing platform 120 may train a machine learning model based on historical response data. For example, the historical response data may include data provided in response to a previous request from the client (e.g., user computing device 110) to the server (e.g., database computer system 130). In addition, cognitive auditing computing platform 120 may generate the predicted response data based on the trained machine learning model. In some examples, training the machine learning model based on the historical response data may include training the machine learning model based on actual data from previous responses to requests over a predetermined period of time (e.g., in the last year). Machine learning algorithms utilized by cognitive auditing computing platform 120 may be supervised and/or unsupervised. Examples of supervised learning techniques that may be utilized by cognitive auditing computing platform 120 may include Bayesian classifiers, decision trees, neural networks, regression, and/or support-vector machines. Examples of unsupervised learning techniques that may be utilized by cognitive auditing computing platform 120 may include clustering algorithms, such as k-means.

Figure 2B:
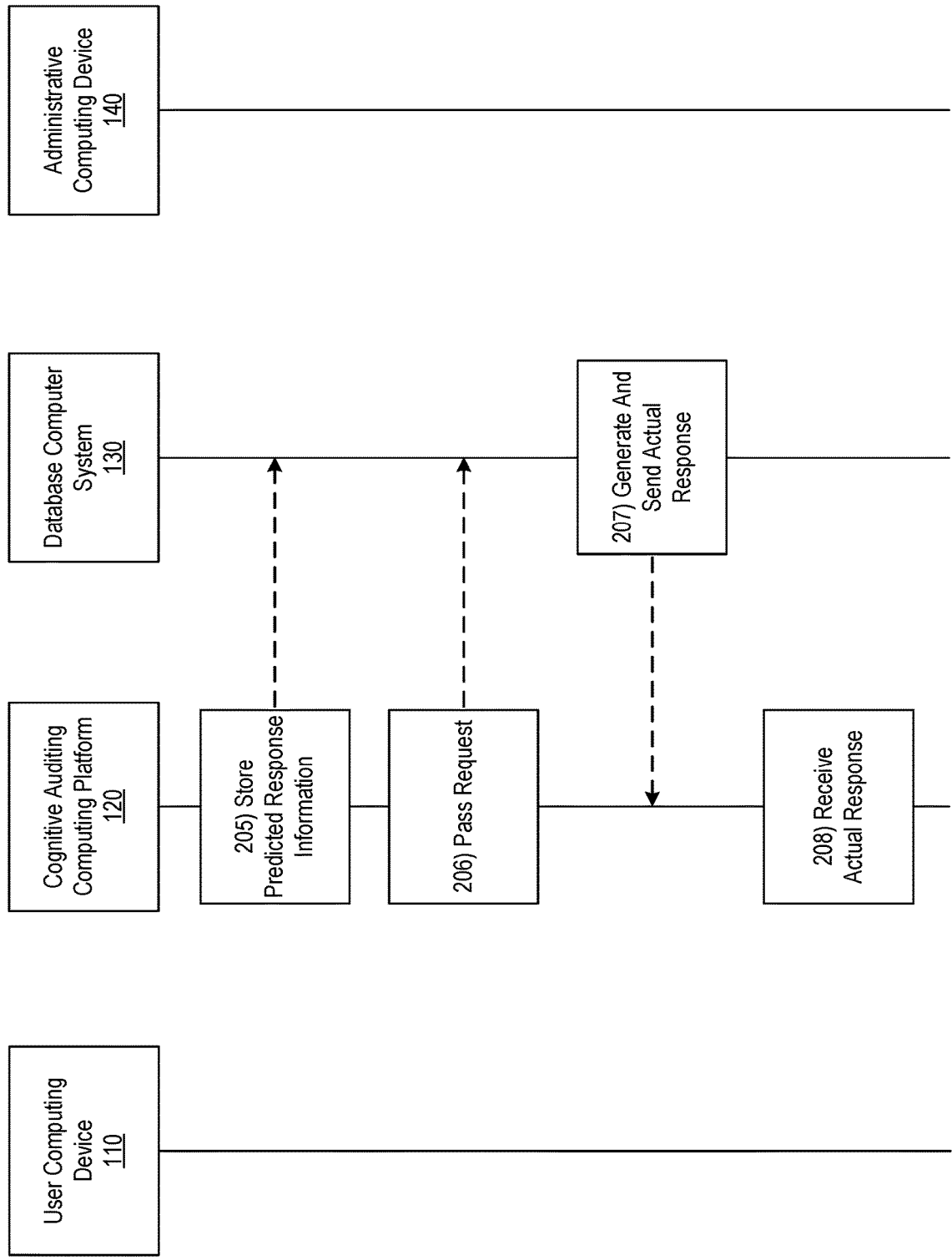

Referring to FIG. 2B, at step 205, cognitive auditing computing platform 120 may store the predicted response data in at least one database (e.g., database computer system 130), which may be maintained by the computing platform or any of the devices described herein.

At step 206, cognitive auditing computing platform 120 may pass, or transmit, via the communication interface (e.g., communication interface 123), the request to the application server (e.g., database computer system 130). In turn, at step 207, cognitive auditing computing platform 120 may cause the application server (e.g., database computer system 130) to return (e.g., generate and send) actual response data. At step 208, cognitive auditing computing platform 120 may receive the actual response data.

Figure 2C:
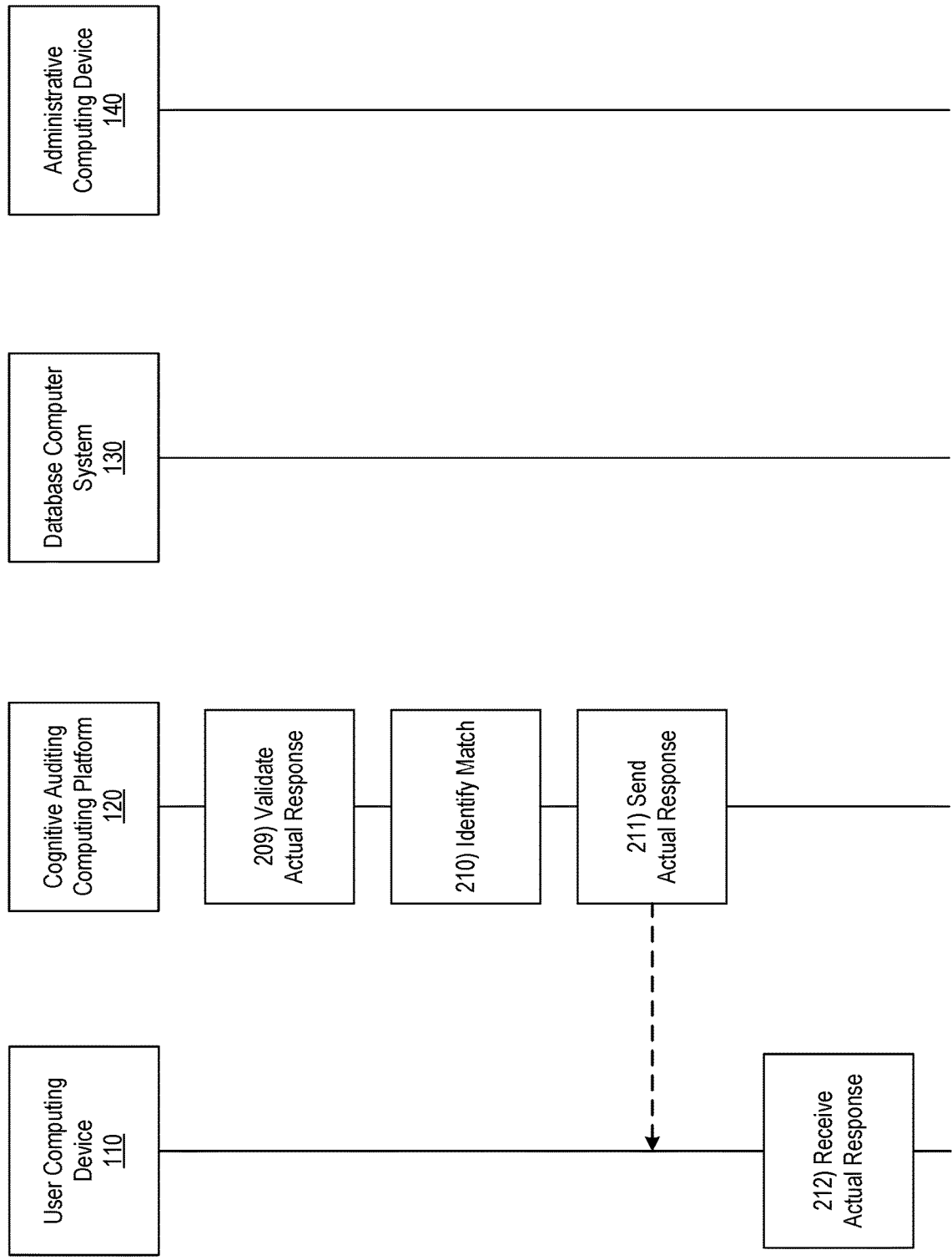

Referring to FIG. 2C, at step 209, cognitive auditing computing platform 120 may validate the actual response data. For example, in validating the actual response data, cognitive auditing computing platform 120 may compare the actual response data (e.g., received at step 208) with the predicted response data (e.g., generated at step 204). In some examples, validating the actual response data may include verifying a structure and/or content of the actual response data. By way of non-limiting example, the response data may be in JavaScript Object Notation (JSON) format, and cognitive auditing computing platform 120 may verify that a return JSON object includes a set of tags expected (e.g., predicted) as being included in the actual response data. Additionally or alternatively, the response data may be in XML or another structured, machine-readable format.

Based on comparing the actual response data (e.g., received at step 208) with the predicted response data (e.g., generated at step 204), cognitive auditing computing platform 120 may identify whether the actual response data matches the predicted response data.

Figure 2D:
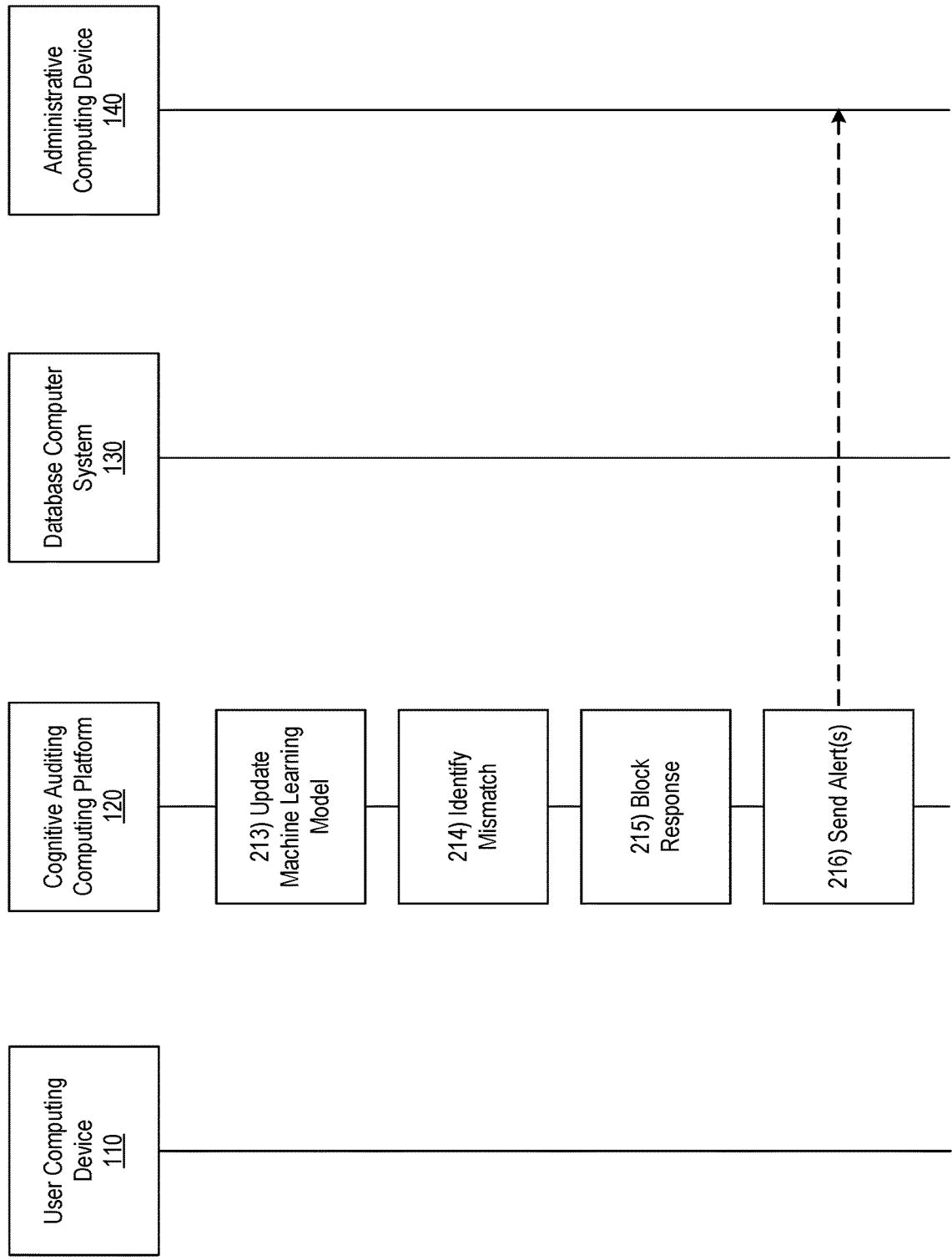

In some examples, at step 210, cognitive auditing computing platform 120 may determine that the actual response data matches the predicted response data. As a result, at step 211, cognitive auditing computing platform 120 may send, via the communication interface (e.g., communication interface 123), the actual response data to the user device (e.g., user computing device 110). At step 212, cognitive auditing computing platform 120 may cause the user computing device (e.g., user computing device 110) to receive and present the actual response (e.g., on a user interface of user computing device 110). Referring to FIG. 2D, at step 213, cognitive auditing computing platform 120 may train or update a machine learning model based on the actual response data (e.g., updating valid request-response pairs).

In some examples, at step 214, cognitive auditing computing platform 120 may determine that the actual response data does not match the predicted response data (e.g., identifying a mismatch). As a result, at step 215, cognitive auditing computing platform 120 may flag, block, or otherwise prevent the actual response data from being sent to the user device (e.g., user computing device 110). By way of non-limiting example, if a user is requesting to check an account balance, and the application server responds with payment information, cognitive auditing computing platform 120 may detect a mismatch with predicted response data and block the response from being sent to the user. By validating client bound data against client requests, unauthorized access attacks (e.g., SQL injection attacks) may be prevented.

Figure 3:
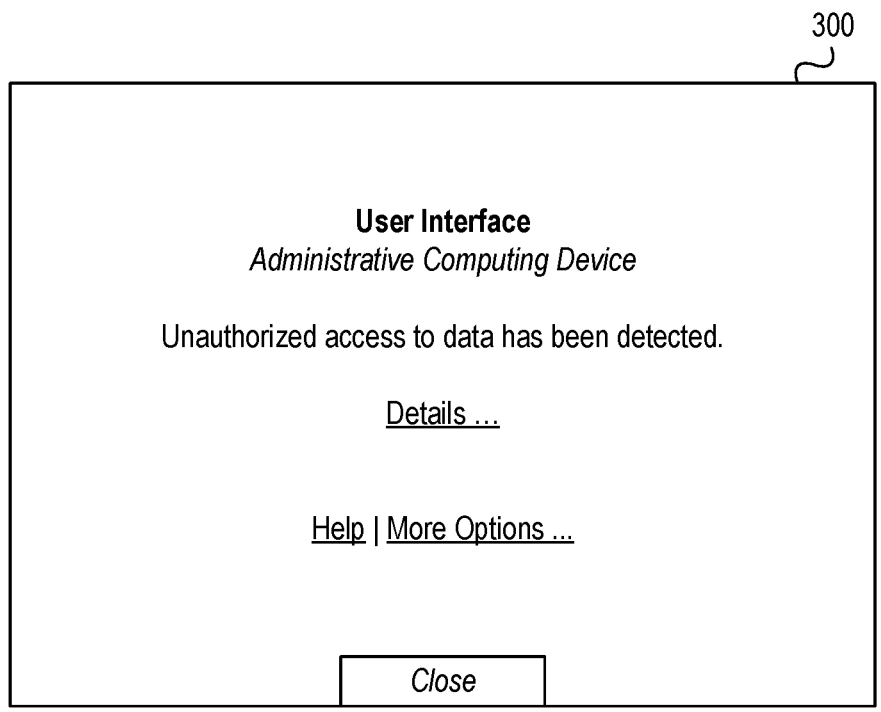
FIG. 3 depicts an example graphical user interface for cognitive auditing of client bound data in accordance with one or more example embodiments.

At step 216, cognitive auditing computing platform 120 may generate and send one or more alerts or notifications. For example, based on identifying that the actual response data does not match the predicted response data, cognitive auditing computing platform 120 may generate and send one or more alerts or notifications to an administrative computing device (e.g., administrative computing device 140) or other computing device regarding fraudulent or problematic activity (e.g., triggering investigations, follow-ups, and/or the like). For example, cognitive auditing computing platform 120 may cause the user computing device (e.g., user computing device 110) to display and/or otherwise present one or more graphical user interfaces similar to graphical user interface 300, which is illustrated in FIG. 3. As seen in FIG. 3, graphical user interface 300 may include text and/or other information associated with an alert or notification (e.g., "Unauthorized access to data has been detected. [Details . . . ]"). For instance, details regarding a detected SQL injection attack or similar attack may be provided. It will be appreciated that other and/or different notifications may also be provided.

Figure 4:
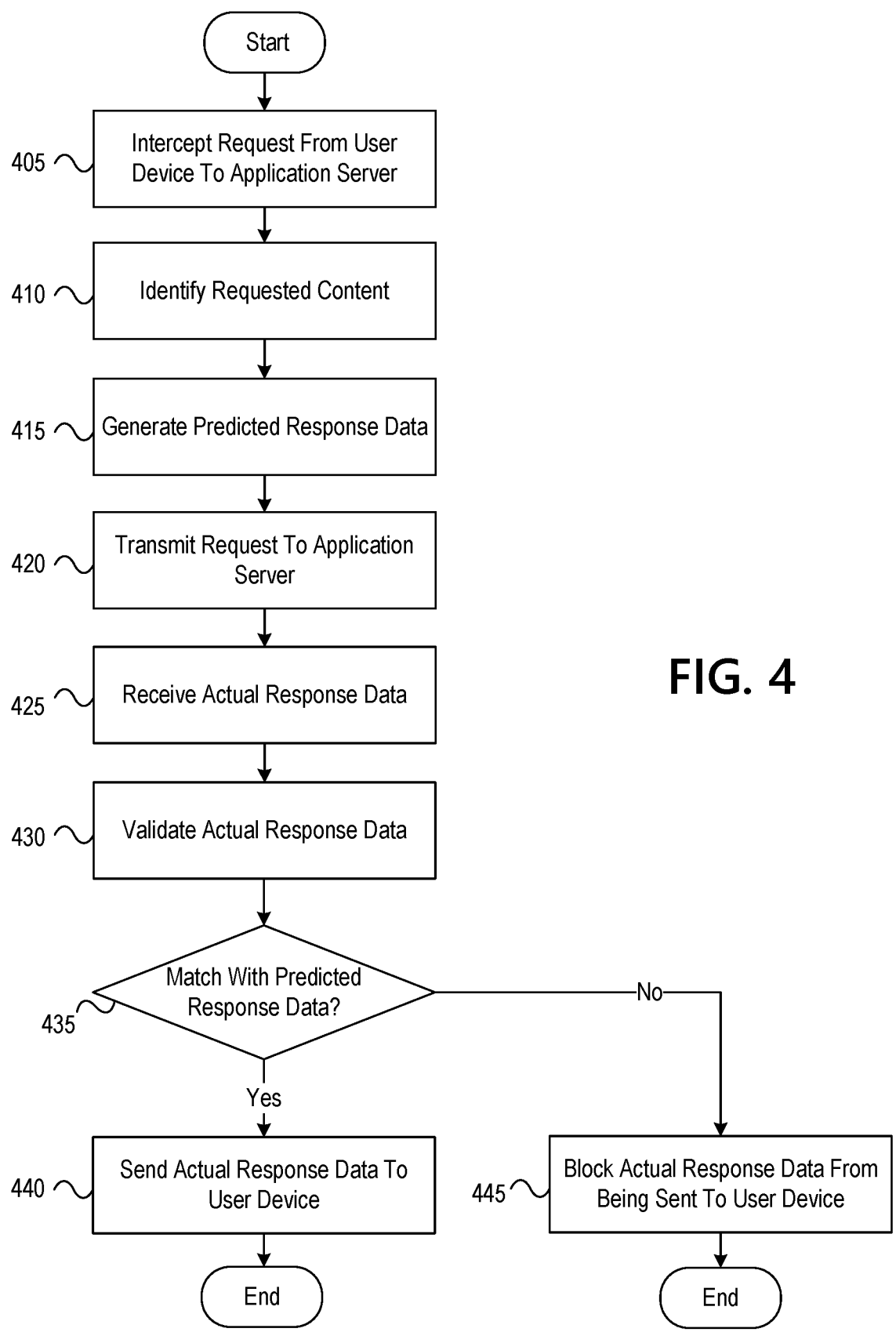
FIG. 4 depicts an illustrative method for cognitive auditing of client bound data in accordance with one or more example embodiments.

FIG. 4 depicts an illustrative method for cognitive auditing of client bound data in accordance with one or more example embodiments. Referring to FIG. 4, at step 405, a computing platform having at least one processor, a communication interface, and memory may intercept a request from a user device to an application server. At step 410, the computing platform may identify content requested by the user device. At step 415, the computing platform may generate predicted response data based on the content requested by the user device. At step 420, the computing platform may transmit the request to the application server. At step 425, responsive to transmitting the request to the application server, the computing platform may receive, from the application server, actual response data. At step 430, the computing platform may validate the actual response data by comparing the actual response data with the predicted response data. At step 435, based on comparing the actual response data with the predicted response data, the computing platform may identify whether the actual response data matches the predicted response data. At step 440, based on identifying that the actual response data matches the predicted response data, the computing platform may send the actual response data to the user device. At step 445, based on identifying that the actual response data does not match the predicted response data, block the actual response data from being sent to the user device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
intercept a request from a user device to an application server;
identify content requested by the user device, wherein the content includes context of the request and a type of operation associated with the request;
generate predicted response data based on the content requested by the user device;
transmit, via the communication interface, the request to the application server;
responsive to transmitting the request to the application server, receive, from the application server, actual response data;
validate the actual response data by comparing the actual response data with the predicted response data;
based on comparing the actual response data with the predicted response data, identify whether the actual response data matches the predicted response data, wherein identifying whether the actual response data matches the predicted response data includes at least identifying whether the type of operation in the content requested by the user device matches a type of operation in the actual response data; and
based on identifying that the actual response data matches the predicted response data, send, via the communication interface, the actual response data to the user device.

2. The computing platform of claim 1, wherein the memory stores additional computer-readable instructions that, when executed by the at least one processor, cause the computing platform to:
based on identifying that the actual response data does not match the predicted response data, block the actual response data from being sent to the user device.

3. The computing platform of claim 1, wherein the memory stores additional computer-readable instructions that, when executed by the at least one processor, cause the computing platform to:
based on identifying that the actual response data does not match the predicted response data, send an alert to an administrative computing device.

4. The computing platform of claim 1, wherein the memory stores additional computer-readable instructions that, when executed by the at least one processor, cause the computing platform to:
train a machine learning model based on historical response data; and
generate the predicted response data based on the trained machine learning model.

5. The computing platform of claim 4, wherein training the machine learning model based on the historical response data comprises training the machine learning model based on actual data from previous responses to requests over a predetermined period of time.

6. The computing platform of claim 1, wherein validating the actual response data comprises verifying a structure of the actual response data.

7. The computing platform of claim 1, wherein validating the actual response data comprises verifying content of the actual response data.

8. The computing platform of claim 1, wherein the request from the user device to the application server comprises a request for sensitive information.

9. The computing platform of claim 1, wherein generating the predicted response data based on the content requested by the user device comprises identifying the context of the request from the user device to the application server.

10. The computing platform of claim 1, wherein generating the predicted response data based on the content requested by the user device comprises identifying the type of operation associated with the request from the user device to the application server.

11. The computing platform of claim 1, wherein the memory stores additional computer-readable instructions that, when executed by the at least one processor, cause the computing platform to:
store the predicted response data generated based on the content requested by the user device.

12. A method, comprising:
at a computing platform comprising at least one processor, a communication interface, and memory:
intercepting by the at least one processor, a request from a user device to an application server;
identifying, by the at least one processor, content requested by the user device, wherein the content includes context of the request and a type of operation associated with the request;
generating, by the at least one processor, predicted response data based on the content requested by the user device;
transmitting, by the at least one processor, via the communication interface, the request to the application server;
responsive to transmitting the request to the application server, receiving, by the at least one processor, from the application server, actual response data;
validating, by the at least one processor, the actual response data by comparing the actual response data with the predicted response data;
based on comparing the actual response data with the predicted response data, identifying, by the at least one processor, whether the actual response data matches the predicted response data, wherein identifying whether the actual response data matches the predicted response data includes at least identifying whether the type of operation in the content requested by the user device matches a type of operation in the actual response data; and
based on identifying that the actual response data matches the predicted response data, sending, by the at least one processor, via the communication interface, the actual response data to the user device.

13. The method of claim 12, further comprising:
based on identifying that the actual response data does not match the predicted response data, blocking, by the at least one processor, the actual response data from being sent to the user device.

14. The method of claim 12, further comprising:
based on identifying that the actual response data does not match the predicted response data, sending, by the at least one processor, an alert to an administrative computing device.

15. The method of claim 12, further comprising:
training, by the at least one processor, a machine learning model based on historical response data; and
generating, by the at least one processor, the predicted response data based on the trained machine learning model.

16. The method of claim 12, wherein validating the actual response data comprises verifying a structure or content of the actual response data.

17. The method of claim 12, wherein the request from the user device to the application server comprises a request for sensitive information.

18. The method of claim 12, wherein generating the predicted response data based on the content requested by the user device comprises identifying the context of the request from the user device to the application server.

19. The method of claim 12, wherein generating the predicted response data based on the content requested by the user device comprises identifying the type of operation associated with the request from the user device to the application server.

20. One or more non-transitory computer-readable media storing instructions that, when executed by a computing platform comprising at least one processor, a communication interface, and memory, cause the computing platform to:
intercept a request from a user device to an application server;
identify content requested by the user device, wherein the content includes context of the request and a type of operation associated with the request;
generate predicted response data based on the content requested by the user device;
transmit, via the communication interface, the request to the application server;
responsive to transmitting the request to the application server, receive, from the application server, actual response data;

validate the actual response data by comparing the actual response data with the predicted response data;

based on comparing the actual response data with the predicted response data, identify whether the actual response data matches the predicted response data, wherein identifying whether the actual response data matches the predicted response data includes at least identifying whether the type of operation in the content requested by the user device matches a type of operation in the actual response data; and based on identifying that the actual response data matches the predicted response data, send, via the communication interface, the actual response data to the user device.

\* \* \* \* \*